United States Patent
Byun et al.

(10) Patent No.: US 9,337,450 B2
(45) Date of Patent: May 10, 2016

(54) RECHARGEABLE BATTERY

(71) Applicant: SAMSUNG SDI CO., LTD., Yongin-si, Gyeonggi-do (KR)

(72) Inventors: Sang-Won Byun, Yongin-si (KR); Hong-Hyeon Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 28 days.

(21) Appl. No.: 14/256,152

(22) Filed: Apr. 18, 2014

(65) Prior Publication Data

US 2015/0072222 A1 Mar. 12, 2015

(30) Foreign Application Priority Data

Sep. 12, 2013 (KR) .................. 10-2013-0109961

(51) Int. Cl.
*H01M 2/06* (2006.01)
*H01M 2/08* (2006.01)
*H01M 2/30* (2006.01)

(52) U.S. Cl.
CPC *H01M 2/06* (2013.01); *H01M 2/08* (2013.01); *H01M 2/30* (2013.01)

(58) Field of Classification Search
USPC ................................ 429/179–181
See application file for complete search history.

(56) References Cited

U.S. PATENT DOCUMENTS

| 2012/0148910 | A1 | 6/2012 | Kambayashi et al. |
| 2012/0258356 | A1* | 10/2012 | Kim ............................. 429/179 |
| 2012/0282502 | A1* | 11/2012 | Kim ............................. 429/82 |

FOREIGN PATENT DOCUMENTS

| EP | 1662601 A1 | 5/2006 |
| EP | 1717886 A2 | 11/2006 |
| JP | 09-153351 | 6/1997 |
| JP | 10-199495 | 7/1998 |
| JP | 2005-056649 | 3/2005 |
| JP | 2006324178 A | * 11/2006 |
| JP | 2008-305646 | 12/2008 |
| JP | 2011-048976 | 3/2011 |
| JP | 2011-243559 | 12/2011 |
| KR | 10-2012-0065256 A | 6/2012 |

OTHER PUBLICATIONS

European Search Report dated Jan. 21, 2015.

* cited by examiner

*Primary Examiner* — Gregg Cantelmo
(74) *Attorney, Agent, or Firm* — Lee & Morse, P.C.

(57) ABSTRACT

A rechargeable battery includes an electrode assembly and a cap plate. The electrode assembly is located in a case of the battery, and the cap plate a cap plate is over an opening of the case. The battery also includes a terminal and a gasket. The terminal includes a plurality of sealing protrusions. The gasket is located between the terminal and cap plate and contacts the plurality of sealing protrusions. Together, the sealing protrusions and gasket establish a barrier which prevents electrolyte solution in the case from reaching and eroding the terminal.

13 Claims, 10 Drawing Sheets

RECHARGEABLE BATTERY

CROSS-REFERENCE TO RELATED APPLICATION

Korean Patent Application No. 10-2013-0109961, filed on Sep. 12, 2013, and entitled, "Rechargeable Battery," is incorporated by reference herein in its entirety.

BACKGROUND

1. Field

One or more embodiments described herein relate to a battery.

2. Description of the Related Art

Unlike a primary battery, a rechargeable battery can be repeatedly charged and discharged. Low-capacity rechargeable batteries output low levels of power, and therefore are used in small portable electronic devices such as mobile phones, laptop computers, and camcorders. High-capacity rechargeable batteries are formed by coupling multiple rechargeable batteries in series to output high levels of power. These batteries are suitable for use in driving motors of electric vehicles. Also, rechargeable batteries may be formed to have a cylindrical or prismatic shape.

In order for a rechargeable battery to properly operate, a sufficient amount of electrolyte solution may be injected into the battery case for purposes of impregnating an electrode assembly therein. These batteries have also been equipped with a gasket and lower insulating member. The gasket is provided between a terminal and cap plate to prevent the electrolyte solution from contacting a terminal of the rechargeable battery. The lower insulating member is provided between the cap plate and a current collector.

When charging and discharging is continuously repeated, operating performance of the gasket and/or lower insulating member may deteriorate over time as a result of an increase in internal battery temperature or pressure. This deterioration may allow the electrolyte solution in the case to permeate between the gasket and one or more battery terminals, or between the lower insulating member and battery terminals. As a result, the terminals may erode by the electrolyte solution and short circuit may occur inside the battery. Also, a current path may form between the terminal and cap plate.

The gasket is to be compressed between the terminal and cap plate. Accordingly, the gasket has been made of a material having elasticity and rigidity. The lower insulating member is made of a material with less elasticity and less rigidity. These differences in materials may increase the cost of implementing the gasket and lower insulating member in the battery.

Attempts have been made to overcome these drawbacks. For example, the gasket and lower insulating member may be integrally formed to prevent terminal erosion or internal short-circuits caused by the electrolyte solution. This will allow the lower insulating material and gasket to be made of the same material. However, integrally forming the gasket and lower insulating also increases manufacturing costs because of the special design required for the integral formation.

SUMMARY

In accordance with one embodiment, a rechargeable battery includes a case; an electrode assembly in the case; a cap plate over an opening of the case; a first terminal in the cap plate and including a plurality of sealing protrusions; and a first gasket between the first terminal and cap plate and contacting the plurality of sealing protrusions. The first terminal may include a first terminal flange protruding from a first pillar terminal. The sealing protrusions may be on the first terminal flange.

Each of the sealing protrusions has a closed-curved line shape, and the closed-curved line shape is around an external circumferential surface of the first pillar terminal. The first gasket may include a compression protrusion between the sealing protrusions. The compression protrusion may be in a closed-curved line shape.

The plurality of sealing protrusions may include a second sealing protrusion spaced from a first sealing protrusion, and the compression protrusion may be between the first and second sealing protrusions. The compression protrusion may include a second compression protrusion spaced from a first compression protrusion.

The plurality of sealing protrusions may include a first sealing protrusion, a second sealing protrusion spaced from the first sealing protrusion, and a third sealing protrusion spaced from the second sealing protrusion. The first compression protrusion may be between the first and second sealing protrusions. The second compression protrusion may be between the second and third sealing protrusions.

The rechargeable battery may include a first lower insulating member between the cap plate and electrode assembly, wherein the first lower insulating member is connected to the first terminal. The first gasket and the first lower insulating member may be made of different materials. The first gasket may be made of a material including perfluoroalkoxy, and the lower insulating member may be made of a material including polypropylene.

In accordance with another embodiment, a rechargeable battery includes a terminal; a gasket coupled to the terminal; and at least one surface between the gasket and a surface of the terminal, wherein the at least one surface and the surface of the terminal have different shapes, and wherein the at least one surface and the gasket establish a barrier between an interior space of the battery which includes an electrolyte solution and the terminal.

The shape of the surface of the terminal may be substantially flat, and the shape of the at least one surface may be curved. The at least one curved surface may be between the surface of the terminal and the gasket. The at least one curved surface may have a convex shape, and/or may be integrally formed with the terminal.

A plurality of surfaces between the gasket and the surface of the terminal may establish barriers between the interior space of the battery and the terminal. The plurality of surfaces may be concentrically formed around the terminal. The plurality of surfaces are integrally formed with the terminal.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
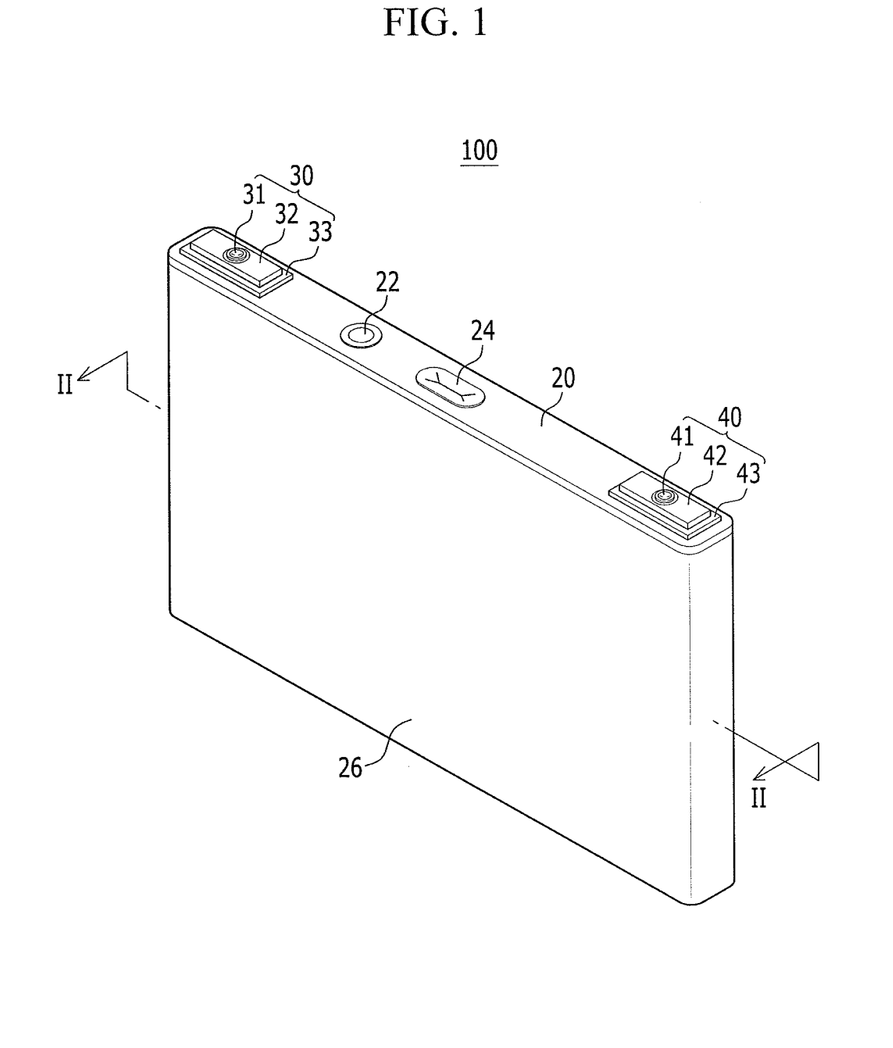
FIG. 1 illustrates a first embodiment of a rechargeable battery.
Figure 2:
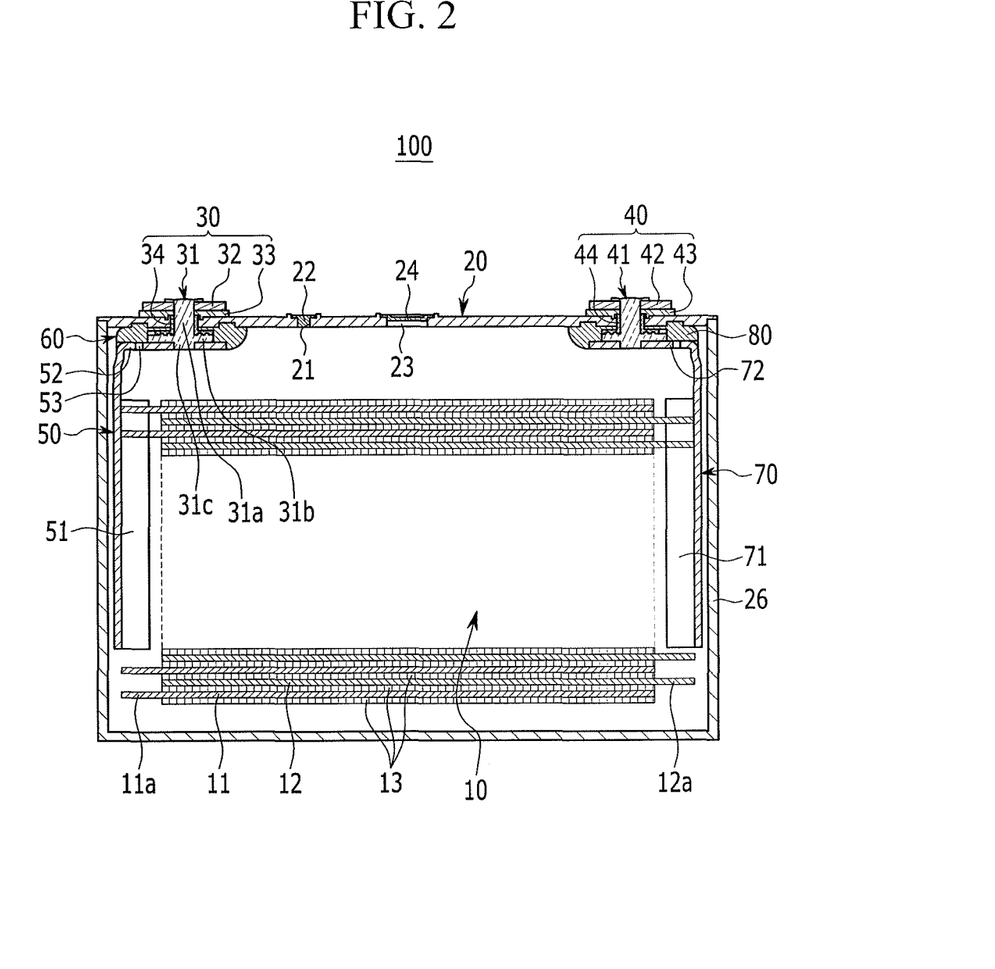
FIG. 2 illustrates a view along section line II-II in FIG. 1.

FIG. 1 illustrates a first embodiment of a rechargeable battery 100, and FIG. 2 illustrates a cross-sectional view along line II-II in FIG. 1. Referring to FIGS. 1 and 2, rechargeable battery 100 includes an electrode assembly 10, first and second terminal sections 30 and 40, and a cap plate 20. The electrode assembly in a case 26 and may be formed by winding a first electrode 11 and a second electrode 12. A separator 13 may be interposed between electrodes 11 and 12. The first and second terminal sections 30 and 40 are electrically combined with electrode assembly 10. The cap plate 20 is connected over an opening in the case 26. First and second lower insulating members 60 and 80 are also provided in the case 26.

The rechargeable battery 100 is illustrated to have a prism-shaped lithium ion rechargeable battery. However, in other embodiments, battery 100 may have a different shape and/or may be of a type different from a lithium polymer battery.

The first electrode 11 may be a negative electrode and the second electrode 12 may be a positive electrode. In other embodiments, the first electrode 11 may be a positive electrode and the second electrode 12 may be a negative electrode.

The electrode assembly 10 may have a jelly roll shape by winding the first electrode 11, the second electrode 12, and the separator 13 together. The first electrode 11 and the second electrode 12 may respectively include a current collector formed of a thin metal foil and an active material coated on the surface of each current collector.

The first electrode 11 and the second electrode 12 may be divided into coated regions and uncoated regions. The coated regions may correspond to locations where an active material is coated on the current collector. First and second electrode uncoated regions 11a and 12a correspond to locations where the active material is not coated.

Additionally, the coated regions may occupy a greater part of the first and second electrodes 11 and 12 in the electrode assembly 10. The first and second electrode uncoated regions 11a and 12a may be disposed at respective sides of the coated regions and may have a jelly roll shape. In alternative embodiments, the electrode assembly 10 may have a layered structure, where, for example, the first and second electrodes 11 and 12, respectively formed of a plurality of sheets, are layered with one or more separators 13 interposed between them.

The first terminal section 30 may be electrically connected to the first electrode uncoated region 11a through a first current collecting member 50. The second terminal section 40 may be electrically connected to the second electrode uncoated region 12a through a second current collecting member 70.

The case 26 may be roughly formed in a cuboid shape and may include an opening formed at one side thereof. In other embodiments, the case may have a different shape such as, for example, a cylinder or a pouch.

The cap plate 20 may be made of a thin plate and may close and seal the opening while being combined thereto. In addition, the cap plate 20 may be formed with an electrolyte injection opening 21 for injecting an electrolyte solution into the sealed case 26. The electrolyte injection opening 21 may be closed and sealed by a sealing cap 22 after injection.

A vent hole 23 may be provided in cap plate 20. A vent plate 24 may be provided in the vent hole 23 and broken when internal pressure of the sealed case 26 is increased above a predetermined value.

The first and second terminal sections 30 and 40 may respectively include first and second terminals 31 and 41, first and second terminal plates 32 and 42, first and second terminal insulating members 33 and 43 between the first and second terminal plates 32 and 42 and the cap plate 20, and first and second gaskets 34 and 44.

The first terminal 31 may be formed in a rivet shape and may include a first pillar terminal 31a, a first terminal flange 31b protruding from the first pillar terminal 31a, and a first terminal coupling protrusion 31c protruding from the first terminal flange 31b. The second terminal 41 may have a structure similar to the first terminal 31.

The first current collecting member 50 includes a first electrode coupling portion 51 connected to the first electrode 11, a first terminal coupling portion 52 connected to the first electrode coupling protrusion 31c of the first electrode 41, and a fuse portion 53 including a fuse hole in the first electrode coupling portion 52. The second current collecting member 70 may have a structure similar to the current collecting member 50.

The first and second lower insulating members 60 and 80 may be disposed close to the cap plate 20 inside the case 26. In one embodiment, the first terminal section 30, first current collecting member 50, and first lower insulating member 60 have structures similar to the second terminal section 40, second current collecting member 70, and second lower insulating member 80, respectively. As previously indicated, the first terminal 31 may have a rivet shape. In alternative embodiments, the first terminal 31 may have a different shape such as a bolt or plate shape.

Figure 3:
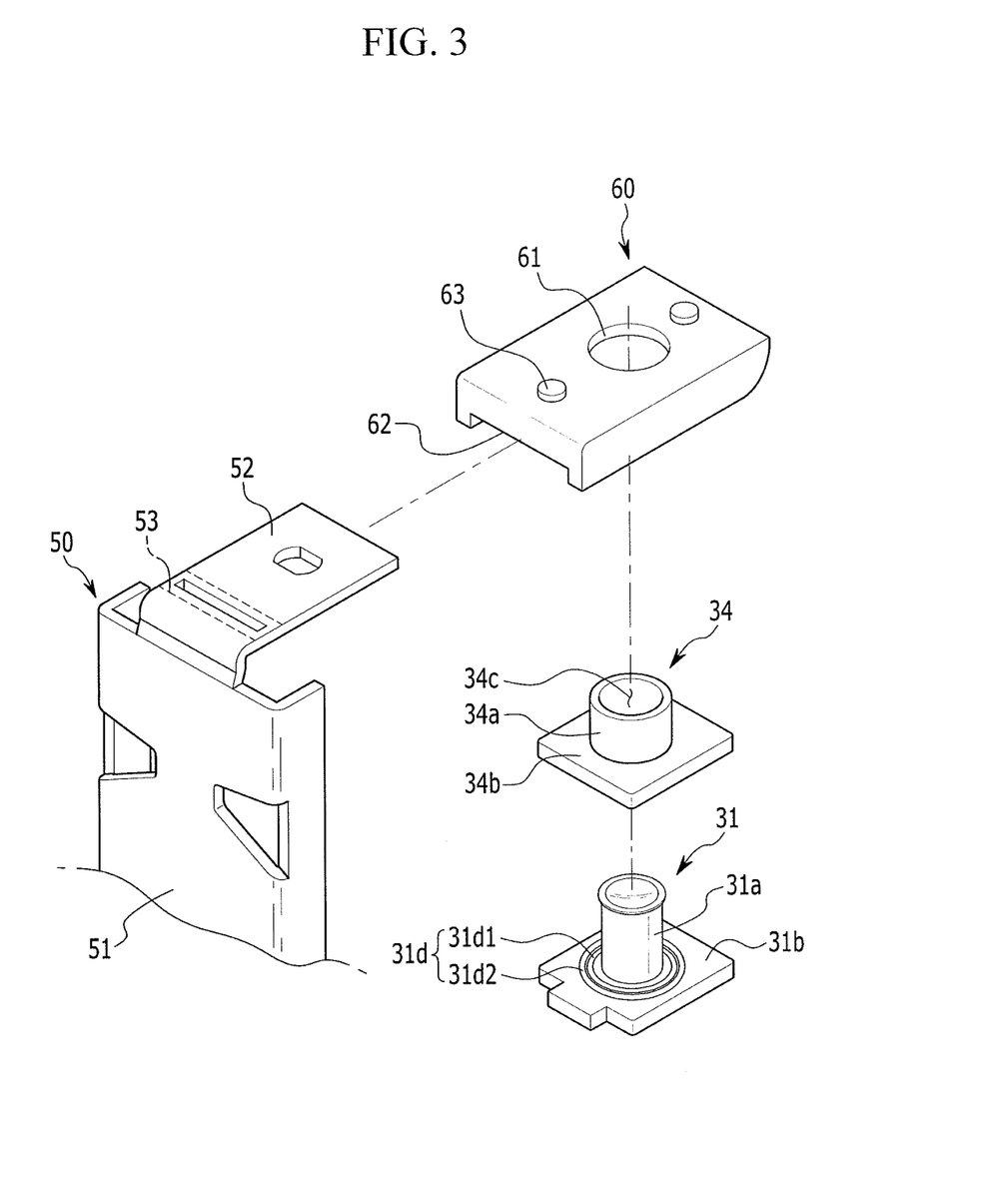
FIG. 3 illustrates an exploded view of the rechargeable battery.
Figure 4:
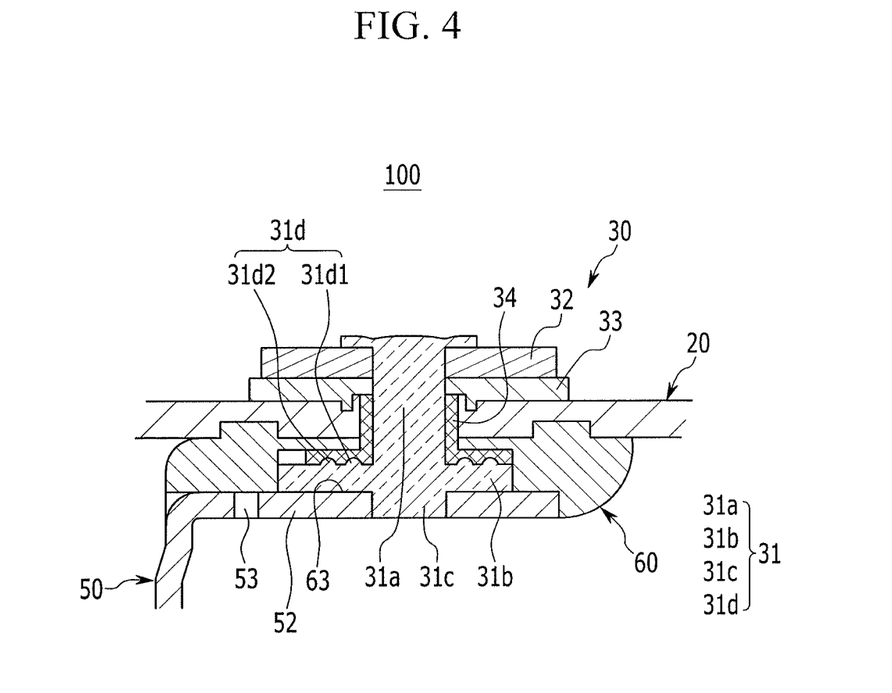
FIG. 4 illustrates a partial cross-sectional view of the rechargeable battery.

FIG. 3 illustrates a partial exploded view of the rechargeable battery 100, and FIG. 4 illustrates a partial cross-sectional view of this battery. Referring to FIG. 3 and FIG. 4, first terminal 31 may be formed to have a plurality of sealing protrusions. The sealing protrusions in the first terminal 31 may be formed to have a closed-curved line shape, to enclose a periphery of the external circumferential surface of the first pillar terminal 31a. In one embodiment, the sealing protrusions are formed at a first terminal flange 31b of the first terminal 31. In other embodiments, the sealing protrusions may be formed on the first terminal flange 31b and/or may be formed on the external circumference of the first pillar terminal 31a.

The first gasket 34 includes a first gasket body 34a, a first gasket flange 34b protruding from the gasket body 34a, and a first through-hole 34c which the first pillar terminal 31a penetrates. The first through-hole 34c in the first gasket 34 is placed on and combined with the first pillar terminal 31a of first terminal 31. In this arrangement, first gasket flange 34b is on or closely attached to first terminal flange 31b.

In addition, in their combined form, the first gasket 34 and first terminal 31 are inserted in a first coupling hole 61 of the first lower insulating member 60. The first terminal flange 31b is fixed to a second coupling hole or recess 62 of the first lower insulating member 60. The first lower insulating member 60 is combined with the cap plate 20 by a fixing protrusion 63, such that the first terminal 31 and first gasket 34 are fixed to the cap plate 20 through the lower insulating member 60.

The first terminal coupling portion 52 of the first current collecting member 50 is combined to the first coupling protrusion 31c of the first terminal 31. The first terminal coupling portion 52 is then fixed to the first coupling hole 62.

In one embodiment, a plurality of sealing protrusions 31d may be formed at one side of the first terminal flange 31b facing the first gasket flange 34b. The sealing protrusions 31d may be integrally formed with the first terminal flange 31b, or the sealing protrusions 31d and the first terminal flange 31b may have mating features which allow them to be coupled to one another. In other embodiments, the sealing protrusions 31d may be integrally formed or coupled to another portion of first pillar terminal 31a, including but not limited to a vertical surface of this terminal.

The sealing protrusions 31d may include a first sealing protrusion 31d1 and a second sealing protrusion 31d2. The first sealing protrusion 31d1 is spaced from an external circumferential surface of the first pillar terminal 31a. The first sealing protrusion 31d1 may have a closed-curved line shape to enclose a periphery of the external circumferential surface of the first pillar terminal 31a. The second sealing protrusion 31d2 is spaced from the first sealing protrusion 31d1, and may have a closed-curved line shape to enclose the first sealing protrusion 31d1. The first sealing protrusion 31d1 is disposed between the second sealing protrusion 31d1 and the first pillar terminal 31a. In an alternative embodiment, the first and second sealing protrusions 31d1 and 31d2 may have a shape different from a closed-curved line shape.

The first and second sealing protrusions 31d1 and 31d2 may be respectively formed with a plurality of protrusions disposed apart from each other.

The first gasket body 34a of the first gasket 34 is disposed between the first terminal 31 and cap plate 20. The first gasket flange 34b is disposed between the first terminal flange 31b and the first lower insulating member 60.

In one embodiment, the first terminal flange 31b is closely attached to the first gasket flange 34b and may be formed with the first and second sealing protrusions 31d1 and 31d2, to thereby increase the contact area of the first gasket flange 34b and the first terminal flange 31b. As a result, a passage for the electrolyte solution cannot be easily established or may be prevented between the first gasket flange 34b and the first terminal flange 31b.

Moreover, because the formation of such a passage is prevented, a short circuit caused by a current path between the first terminal 31 and cap plate 26, formed by the electrolyte solution passing between the first terminal 31 and the first gasket 34, may be prevented.

In one embodiment, the first gasket 34 and first lower insulating member 60 is not integrally formed. As a result, the first gasket 34 and first lower insulating member 60 may be made of different materials. For example, the first gasket 34 may be made of perfluoroalkoxy and first lower insulating member 60 may be made of polypropylene. This embodiment may be less expensive to manufacture because the polypropylene used to form the first lower insulating member 60 may be cheaper to use than the perfluoroalkoxy used to form the first gasket 34.

In another embodiment, the first gasket 34 and lower insulating member 60 may be integrally formed. In this embodiment, the first gasket 34 may have elastic and rigid features. Because the first lower insulating member 60 is made of the same material as the first gasket 34 (e.g., perfluoroalkoxy), the first lower insulating member will also have elastic and rigid features.

In embodiments where the first gasket 34 and first lower insulating member 60 are separated manufactured (e.g., not integrally formed), an increase in the cost of manufacturing rechargeable battery 100 can be avoided, because the first lower insulating member 60 can be made of a cheaper material than the first gasket 34.

Figure 5:
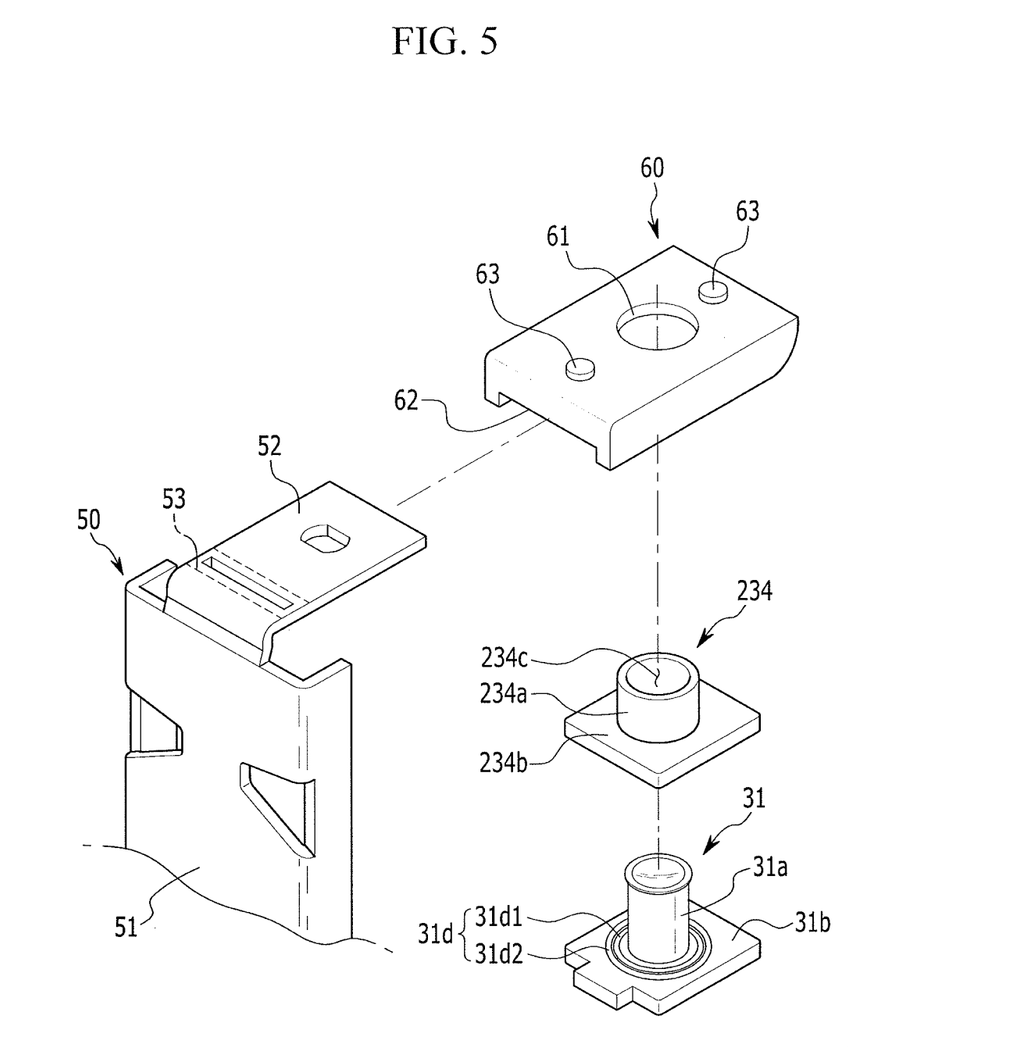
FIG. 5 illustrates a second embodiment of a rechargeable battery.
Figure 6:
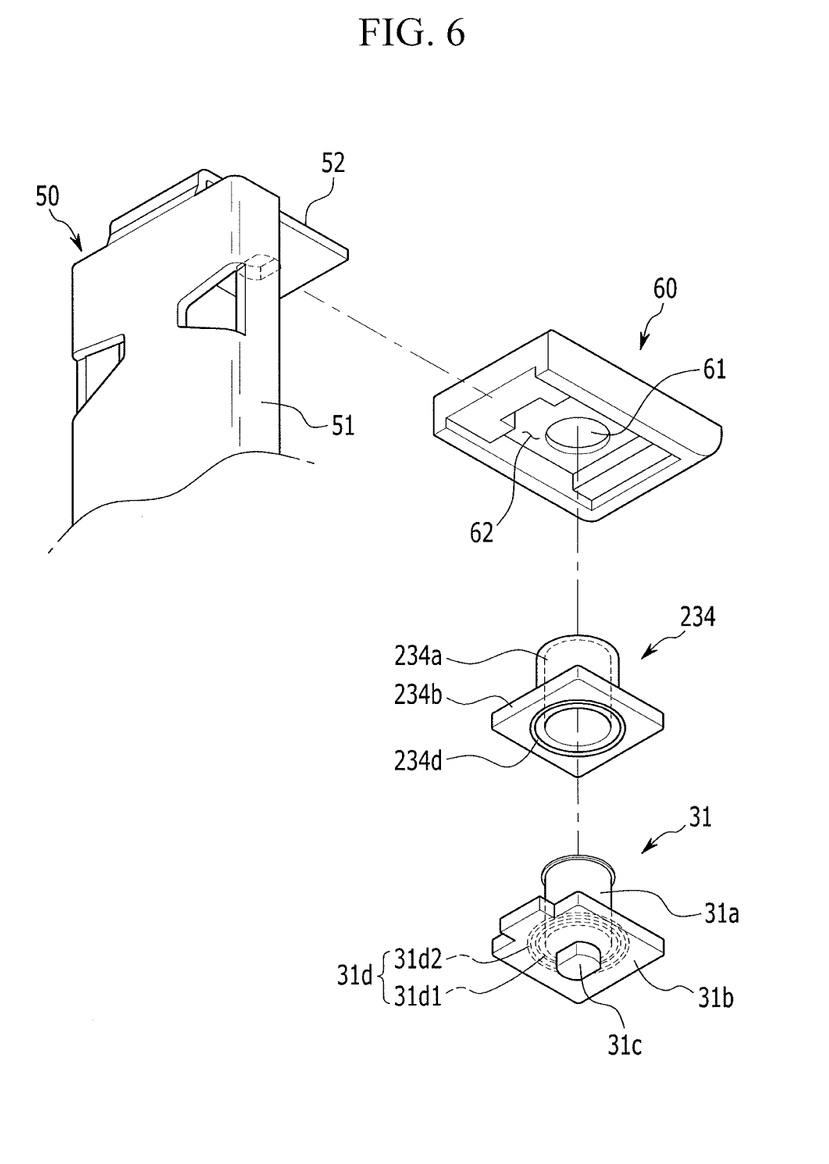
FIG. 6 illustrates a partial exploded view of the battery in FIG. 5.
Figure 7:
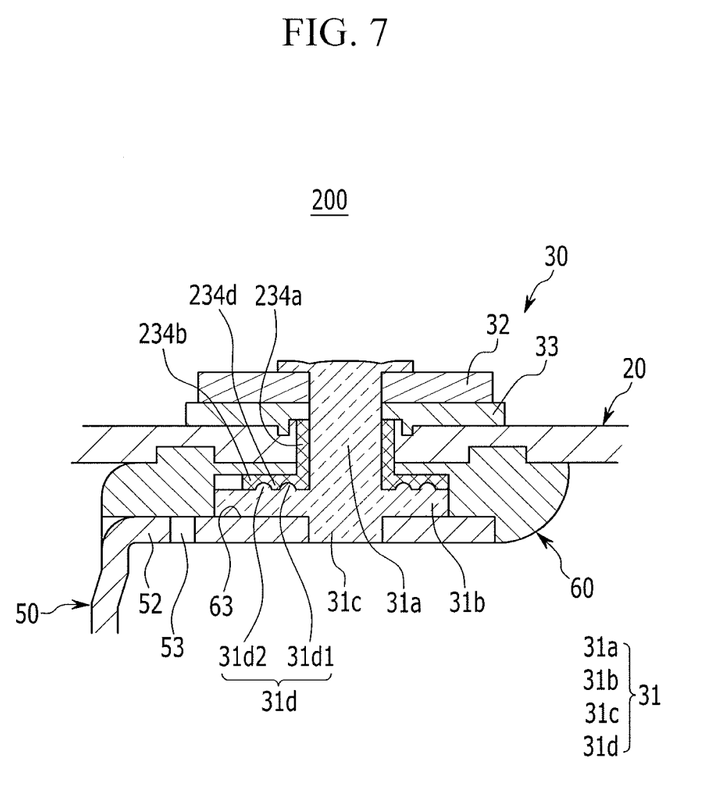
FIG. 7 illustrates a partial cross-sectional view of the battery in FIG. 5.

FIG. 5 and FIG. 6 illustrate a second embodiment of a rechargeable battery 200, and FIG. 7 illustrates a partial cross-sectional view of this battery. Referring to FIGS. 5 to 7, the rechargeable battery 200 may have the same structure as battery 100, except for first gasket 234.

The first gasket 234 includes a first gasket body 234a, a first gasket flange 234b, a first through-hole 234c, and a compression protrusion 234d. The compression protrusion 234d may be formed in a closed-curved line shape, and may be disposed at one side of the first gasket flange 234b facing the first terminal flange 31b of the first terminal 31. In an alternative embodiment, the compression protrusion 234d may be formed in the first gasket flange 234b, and may be formed at the external circumferential side of the first gasket body 234a.

Also, in the present embodiment, the first terminal flange 31b of the first terminal 31 is formed with the sealing protrusion 31d including the first sealing protrusion 31d1 and the second sealing protrusion 31d2.

When the first through-hole 234c in the first gasket 234 is inserted on and combined with by the pillar terminal 31a of the first terminal 31, the compression protrusion 234d is disposed and pressed between the first sealing protrusion 31d1 and the second sealing protrusion 31d2.

Because the first terminal flange 31b is closely attached to the first gasket flange 234b and is formed with the first and second sealing protrusions 31d1 and 31d2, and because the compression protrusion 234d is provided between the first and second sealing protrusions 31d1 and 31d2, the contacting area between the first gasket flange 234b and the first terminal flange 31b may be increased. As a result, the space between the first and second sealing protrusions 31d1 and 31d2 is filled by the compression protrusion 234d.

Thus, a passage for the electrolyte solution between the first gasket flange 234b and the first terminal flange 31b cannot be easily established or may be prevented. Because such a passage may be prevented, a short circuit caused by a current path formed between the first terminal 31 and the cap plate 26, as a result of the electrolyte solution passing between the first terminal 31 and the first gasket 234, may be prevented.

Figure 8:
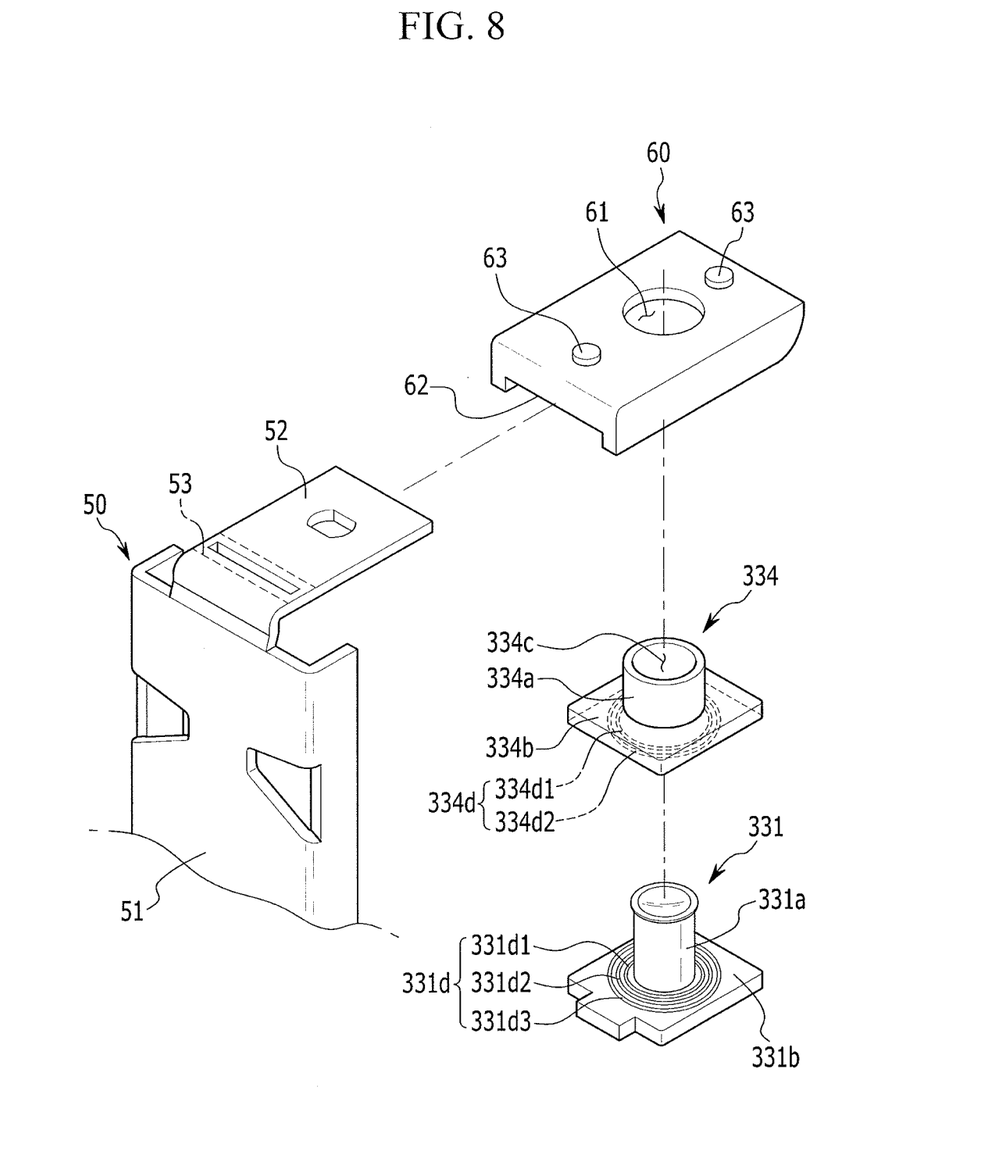
FIG. 8 illustrates a third embodiment of a rechargeable battery.
Figure 9:
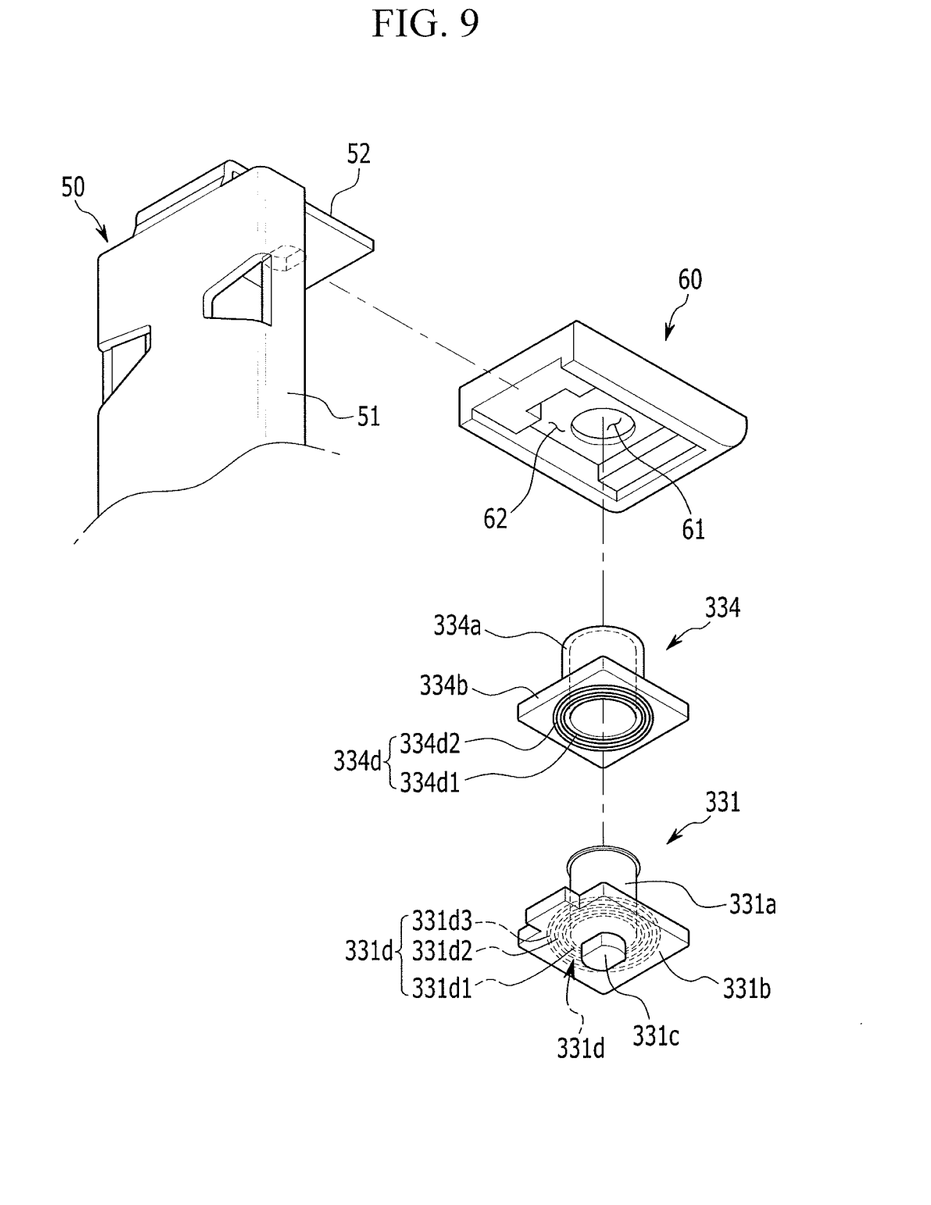
FIG. 9 illustrates a partial exploded view of the battery in FIG. 8.
Figure 10:
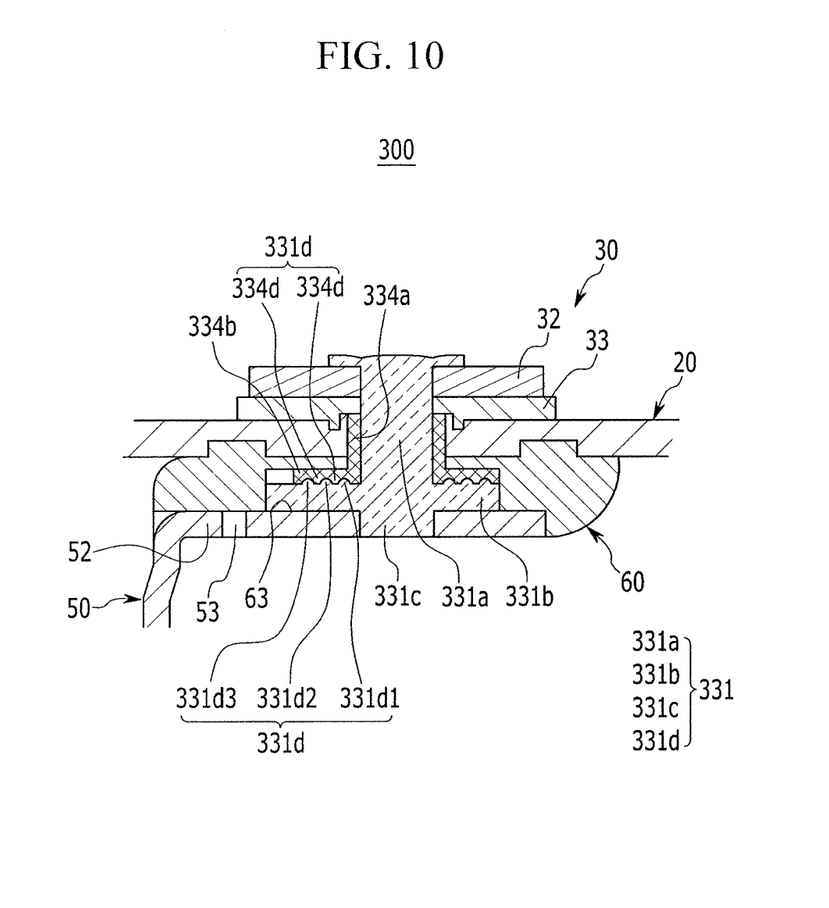
FIG. 10 illustrates a partial cross-sectional view of the battery in FIG. 8.

FIG. 8 and FIG. 9 illustrate a third embodiment of a rechargeable battery 300, and FIG. 10 illustrates a partial cross-sectional view of this battery. Referring to FIGS. 8-10, rechargeable battery 300 may have the same structure as the aforementioned embodiments, except for a first terminal 331 and a first gasket 334.

In this embodiment, the first terminal 331 is formed in a rivet shape and includes a first pillar terminal 331a, a first terminal flange 331b protruding from the first pillar terminal 331a, and a first terminal coupling protrusion 331c protruding from the first terminal flange 331b. In an alternative embodiment, first terminal 331 may have a different shape such as a bolt or plate shape.

In addition, the first terminal 331 includes a plurality of sealing protrusions 331d including a first sealing protrusion 331d1, a second sealing protrusion 331d2 spaced from the first sealing protrusion 331d1, and a third sealing protrusion 331d3 spaced from the second sealing protrusion 331d2. The second sealing protrusion 331d2 may be between the first sealing protrusion 331d1 and the third sealing protrusion 331d3.

The first sealing protrusion 331d1, second sealing protrusion 331d2, and third sealing protrusion 331d3 are respectively formed in a closed-curved line shape to enclose a periphery of an external circumferential surface of the first pillar terminal 31a. These protrusions may also be formed on the first terminal flange 331b. In an alternative embodiment, the first sealing protrusion 331d1, second sealing protrusion 331d2, and third sealing protrusion 331d3 may be formed on an external circumferential surface in the first pillar column 331a.

The first gasket 334 a first gasket body 334a, a first gasket flange 334b protruding from the first gasket body 334a, a first through-hole 334c through which the first pillar terminal 331a passes, and a compression protrusion 334d. More specifically, compression protrusion 334d may be formed in a closed-curved line shape and may be disposed at one side of the first gasket flange 334b facing the first terminal flange 331b of the first terminal 331. In an alternative embodiment, compression protrusion 334d may be formed at an external circumferential surface of the first gasket body 334a.

The compression protrusion 334d includes a first compression protrusion 334d1 formed in a closed-curved line shape, and a second compression protrusion 334d2 in a closed-curved line shape and spaced from the first compression protrusion 334d2.

In one embodiment, when the first pillar terminal 331a of the first terminal 331 is inserted into the first through-hole 334c of the first gasket 334 (to allow the first gasket flanges 334b to be closely attached to the first terminal flange 331b), the first compression protrusion 334d1 is pressed while being disposed between the first and second sealing protrusions 331d1 and 331d2. Also, the second compression protrusion 334d2 is pressed while being disposed between the second and third sealing protrusions 331d2 and 331d3.

The first terminal flange 331b is closely attached to the first gasket flange 334b and is formed with the first sealing protrusion 331d1, second sealing protrusion 331d2, and third sealing protrusion 331d3. The first compression protrusion 334d1 is formed between the first and second sealing protrusions 331d2 and 331d3. Also, the second compression protrusion 334d2 is formed between the second and third sealing protrusions 331d2 and 331d3. This arrangement may increase the contacting area of the first gasket flange 334b and the first terminal flange 331b.

In addition, the space between the first and second sealing protrusions 331d1 and 331d2 and the space between the second and third sealing protrusions 331d2 and 331d3 are respectively filled by the first and second compression protrusions 334d1 and 334d2. Thus, a passage for the electrolyte solution between the first gasket flange 334b and the first terminal flange 331b cannot be easily established or may be prevented.

Because this passage cannot be easily established or prevented, a short circuit caused by a current path formed between the first terminal 331 and the cap plate 26, as a result of the electrolyte solution passing between the first terminal 331 and the first gasket 334, may be prevented.

In accordance with one or more of the aforementioned embodiments, a rechargeable battery has a terminal structure that prevents permeation of an electrolyte solution between a terminal and a cap plate. In accordance with these or other embodiments, a rechargeable battery is provided to have lower manufacturing costs. While the aforementioned embodiments have been described as corresponding to a rechargeable battery, other embodiments may apply to other types of batteries.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
a case;
an electrode assembly in the case;
a cap plate over an opening of the case;
a lower insulating member between the cap plate and electrode assembly;
a first terminal in the cap plate and including a plurality of sealing protrusions; and
a first gasket between the first terminal and cap plate and contacting the plurality of sealing protrusions, wherein the lower insulating member is connected to the first terminal and wherein the sealing protrusions are at a level that is between an upper surface and a lower surface of the lower insulating member, and wherein the upper surface of the lower insulating member is between the gasket and the cap plate.

2. The rechargeable battery as claimed in claim 1, wherein the first terminal includes a first terminal flange protruding from a first pillar terminal.

3. The rechargeable battery as claimed in claim 2, wherein the plurality of sealing protrusions are on the first terminal flange.

4. The rechargeable battery as claimed in claim 3, wherein:
each of the sealing protrusions has a closed-curved line shape, and
the closed-curved line shape is around an external circumferential surface of the first pillar terminal.

5. The rechargeable battery as claimed in claim 3, wherein the first gasket includes a compression protrusion between the sealing protrusions.

6. The rechargeable battery as claimed in claim 5, wherein the compression protrusion is in a closed-curved line shape.

7. The rechargeable battery as claimed in claim 5, wherein:
the plurality of sealing protrusions includes a second sealing protrusion spaced from a first sealing protrusion, and the compression protrusion is between the first and second sealing protrusions.

8. The rechargeable battery as claimed in claim 5, wherein the compression protrusion includes a second compression protrusion spaced from a first compression protrusion.

9. The rechargeable battery as claimed in claim 8, wherein:
the plurality of sealing protrusions includes a first sealing protrusion, a second sealing protrusion spaced from the first sealing protrusion, and a third sealing protrusion spaced from the second sealing protrusion,
the first compression protrusion is between the first and second sealing protrusions, and
the second compression protrusion is between the second and third sealing protrusions.

10. The rechargeable battery as claimed in claim 1, wherein the first gasket and the lower insulating member are made of different materials.

11. The rechargeable battery as claimed in claim 10, wherein:
the first gasket is made of a material including perfluoroalkoxy, and
the lower insulating member is made of a material including polypropylene.

12. A rechargeable battery, comprising:
a case;
an electrode assembly in the case;
a cap plate over an opening of the case;
a lower insulating member between the cap plate and electrode assembly;
a first terminal in the cap plate and including a plurality of sealing protrusions; and
a first gasket between the first terminal and cap plate and contacting the plurality of sealing protrusions, wherein the lower insulating member is connected to the first terminal and wherein the upper surface of the lower insulating member is between the gasket and the cap plate.

13. The rechargeable battery as claimed in claim 12, wherein the sealing protrusions are at a level that is between an upper surface and a lower surface of the lower insulating member.

* * * * *